United States Patent [19]

Yamana et al.

[11] Patent Number: 4,988,068
[45] Date of Patent: Jan. 29, 1991

[54] REMOTE CONTROL MECHANISM

[75] Inventors: Tohru Yamana, Fujieda; Toshiaki Kikuchi, Shimizu, both of Japan

[73] Assignee: Murakami Kameido Co., Ltd., Shizuoka, Japan

[21] Appl. No.: 206,867

[22] Filed: Jun. 9, 1988

[51] Int. Cl.[5] .............................................. G02B 7/18
[52] U.S. Cl. .................................. 248/484; 248/549; 248/900; 248/478; 248/486; 350/604
[58] Field of Search .............. 248/484, 483, 549, 900, 248/417, 288.3, 288.5, 481, 486, 478, 477; 360/635, 632, 604, 606; 74/501 M, 519

[56] References Cited

U.S. PATENT DOCUMENTS

| | | | |
|---|---|---|---|
| 1,532,354 | 4/1925 | Walton | 248/417 |
| 3,549,243 | 12/1970 | Horwitz | 248/483 X |
| 4,254,931 | 3/1981 | Aikens et al. | 248/549 |
| 4,279,473 | 7/1981 | Yamana | . |
| 4,606,819 | 8/1986 | Yamana | 248/900 X |
| 4,626,084 | 12/1986 | Kumai | . |

FOREIGN PATENT DOCUMENTS

| | | | |
|---|---|---|---|
| 2431735 | 1/1976 | Fed. Rep. of Germany | 248/483 |
| 2916686.7 | 4/1979 | Fed. Rep. of Germany | . |
| 2829492 | 1/1980 | Fed. Rep. of Germany | 350/635 |
| 24637 | 2/1986 | Japan | 350/632 |
| 1402902 | 8/1975 | United Kingdom | 248/900 |
| 2071035 | 9/1981 | United Kingdom | . |

Primary Examiner—Alvin C. Chin-Shue
Attorney, Agent, or Firm—Michael J. Striker

[57] ABSTRACT

A remote controlled rearview mirror assembly is disclosed, in which a mirror body is foldably mounted on a shaft forwardly or rearwardly, a mirror is tiltably mounted on a pivot in the mirror body, and a mirror angle control lever with a ball joint provided on the shaft is mounted on the back side of the mirror via a mirror operation arm. The ball joint consists of a pair of semi-spherical members being vertically separable with a clutch provided between opposed surfaces of these members. When the mirror body is folded forwardly or rearwardly from its neutral position, the ball joint is separated into the upper and lower semi-spherical members by the clutch between the opposed surfaces of the members, so that the connection between the control lever and mirror operation arm is released. When the mirror body is returned to the neutral position, the clutch is engaged again to restore the connection between the control lever and mirror operation lever.

8 Claims, 9 Drawing Sheets

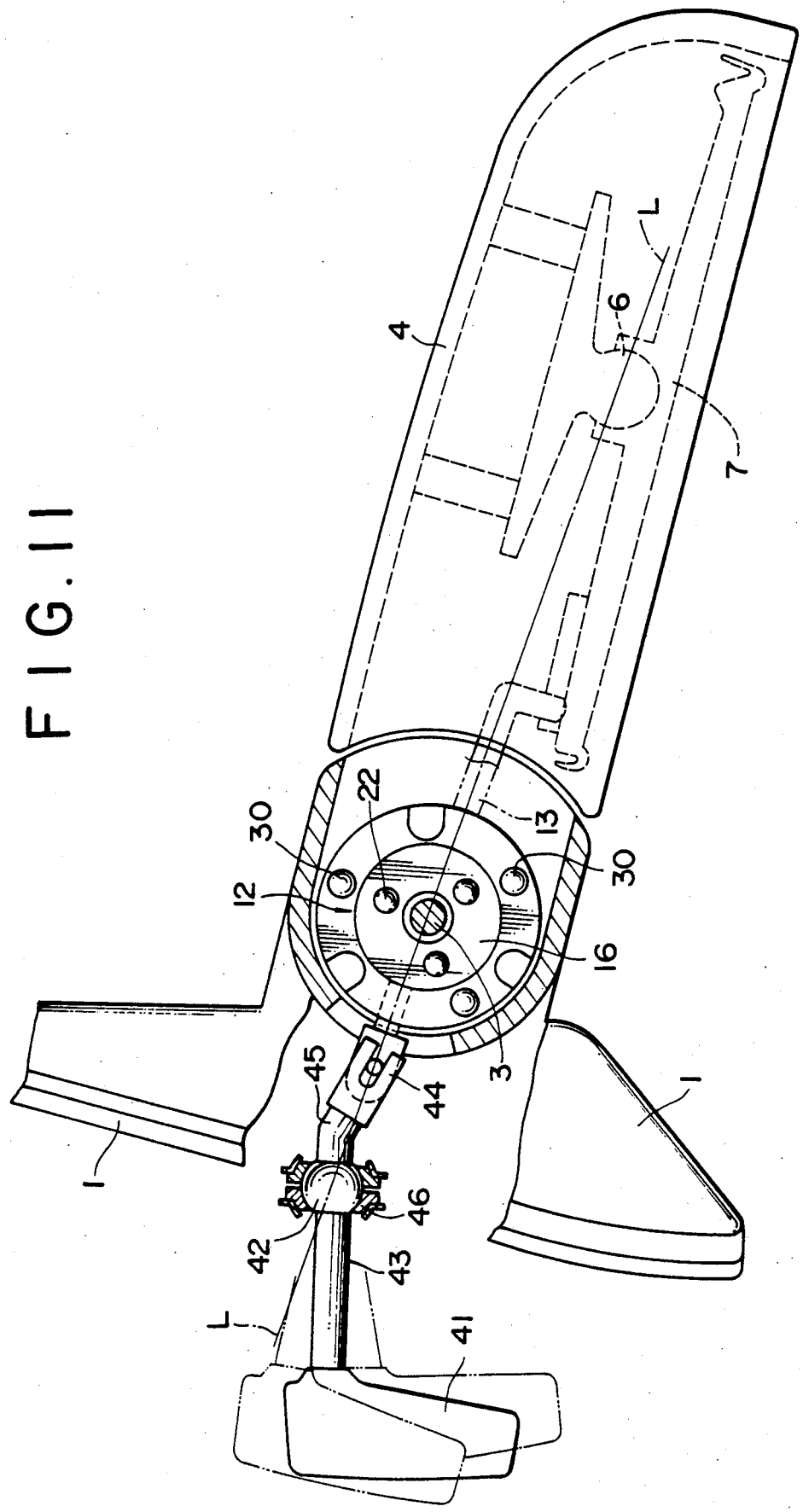

REMOTE CONTROL MECHANISM

BACKGROUND OF THE INVENTION

1. Field of the Invention

The present invention relates to a remote control mechanism and, more particularly, to a remote controlled outside rearview mirror assembly, a mirror body of which can be manually folded forwardly or rearwardly of a vehicle and can be smoothly folded even when an external shock is applied.

2. Prior Art.

The remote controlled outside rearview mirror assembly is usually mounted on the outer side of a vehicle door. The assembly has a mechanism, with which the reflection angle of a mirror panel in the mirror body can be controlled mechanically through a link by tilting a control lever provided in a compartment.

With such a rearview mirror assembly, the area of the mirror tends to be increased for ensuring a wide rearview range. Consequently, the free end of the mirror body projects from each side way of the vehicle to a great extent and is liable to be touched by an object or a man to cause an accident.

Further, the projecting mirror body portion constitutes an increase of the loadage when the vehicle is transported, thus increasing the transportation cost. Further, it constitutes an obstacle when the vehicle is stored in a garage. To solve the above problems, it has been in practice to held in folding the mirror body forwardly or rearwardly of the vehicle and thus accommodate the mirror body within the outermost line of the vehicle body. Such a rearview mirror assembly is disclosed in Deutsche Auslegeschrift No. 2,916,686. With the prior art foldable rearview mirrors, however, it is very difficult to obtain adaptability of the mirror body with a remote control mechanism therefor because of a large folding angle of the mirror body. When adjusting the reflection angle of the mirror panel, the control lever is turned about a shaft vertically and/or laterally. The mirror panel, however, has to be controlled to a necessary angle when the control lever is moved lightly and by a small angle. The control lever is usually designed such that it can be swung vertically or laterally by approximately 16° from its neutral position. However, the mirror body of the foldable rearview mirror assembly is folded to be inside the outermost line of the vehicle body beyond the maximum tilting angle of the control lever. Therefore, there is a design difficulty if it is intended to assemble the remote control mechanism in the mirror body in such a manner that the link is not broken and that the folding of the mirror body is not obstructed. For this reason, it has been proposed to permit adjustment of the reflection angle of the mirror by using a remote controlled mechanism including a three joint link motion having particular structure and length as disclosed in the Deutsch Auslegeschrift described above or an electric remote control mechanism containing a power unit. These remote control mechanisms needs special and expensive link mechanism or motordriven power unit, so that they have some problems to be improve such that they require high costs of manufacture, they consists of large numbers of components and are complicated in structure, and they require comparatively large assembly spaces.

SUMMARY OF THE INVENTION

An object of the invention is to provide a remote control mechanism, which is simple in structure, consists of a comparatively small number of components, can be manufactured inexpensively, does not require a large assembly space and can be adapted to a foldable rearview mirror.

Another object of the invention is to provide a remote control mechanism, which does not only permits adjustment of the reflection angle of a mirror panel in a mirror body by tilting a control lever, and also permits disengagement of the connection between the control lever and a mirror operation arm by a clutch when the mirror body is folded forwardly or rearwardly of the vehicle or folded due to application of a shock to the mirror body, and be engaged again to restore the connection between the control lever and mirror operation arm for adjusting the reflection angle of the mirror panel in an adequate position when the mirror body is erected to its normal operating position.

To achieve the above object of the invention, there is provided a remote control mechanism, which comprises a base, a shaft erected on the base, a ball joint pivotably mounted on the outer periphery of the shaft and consisting of a pair of semi-spherical members being vertically separable with a clutch provided between the opposed surfaces of the members, a pair of ball seats with respective semi-spherical cavity for holding the ball joint, compression spring means for providing a force of engagement to the clutch, a control lever having one end secured to the outer surface of one of the pair semi-spherical members, a mirror operation arm having one end secured to the outer surface of the other semi-spherical member symmetrically with respect to the control lever, and bracket means mounted on the free end of the mirror operation arm and coupled to an operable member.

According to the invention, when transporting or parking the vehicle or when an external shock is applied to the mirror body, the mirror body can be folded forwardly or rearwardly of the vehicle, and also the mirror angle can be controlled under remote control in normal use by manually operating the control lever extending into the compartment.

Particularly, according to the invention the shaft section of the control lever includes a clutch and is provided with a ball joint capable of being vertically separated into two parts. Therefore, when folding the mirror body or when the mirror body receives a shock, the ball joint can be readily separated into upper and lower halves by the clutch, so that the connection between the control lever and mirror operation arm can be automatically released. Thus, the mirror body can be held in folding to be inside the outermost line of the vehicle without destructing the link. Further, when the mirror body is returned to the normal position, the clutch is engaged to restore the connection between the control lever and mirror operation arm at fixed positions so that the angle of the mirror in the mirror body can be controlled under remote control by the control lever.

Further, since the shaft section of the control lever is provided with a ball joint capable of being separated into two parts and including a clutch and spring means, a simple and compact structure can be obtained.

BRIEF DESCRIPTION OF THE DRAWINGS

Further objects and advantages of the present invention will be apparent from the following description, reference being had to the accompanying drawings wherein preferred embodiments of the present invention are clearly shown.

FIG. 11 is a fragmentary sectional view showing the same modification; and

DESCRIPTION OF THE PREFERRED EMBODIMENT

Figure 1:
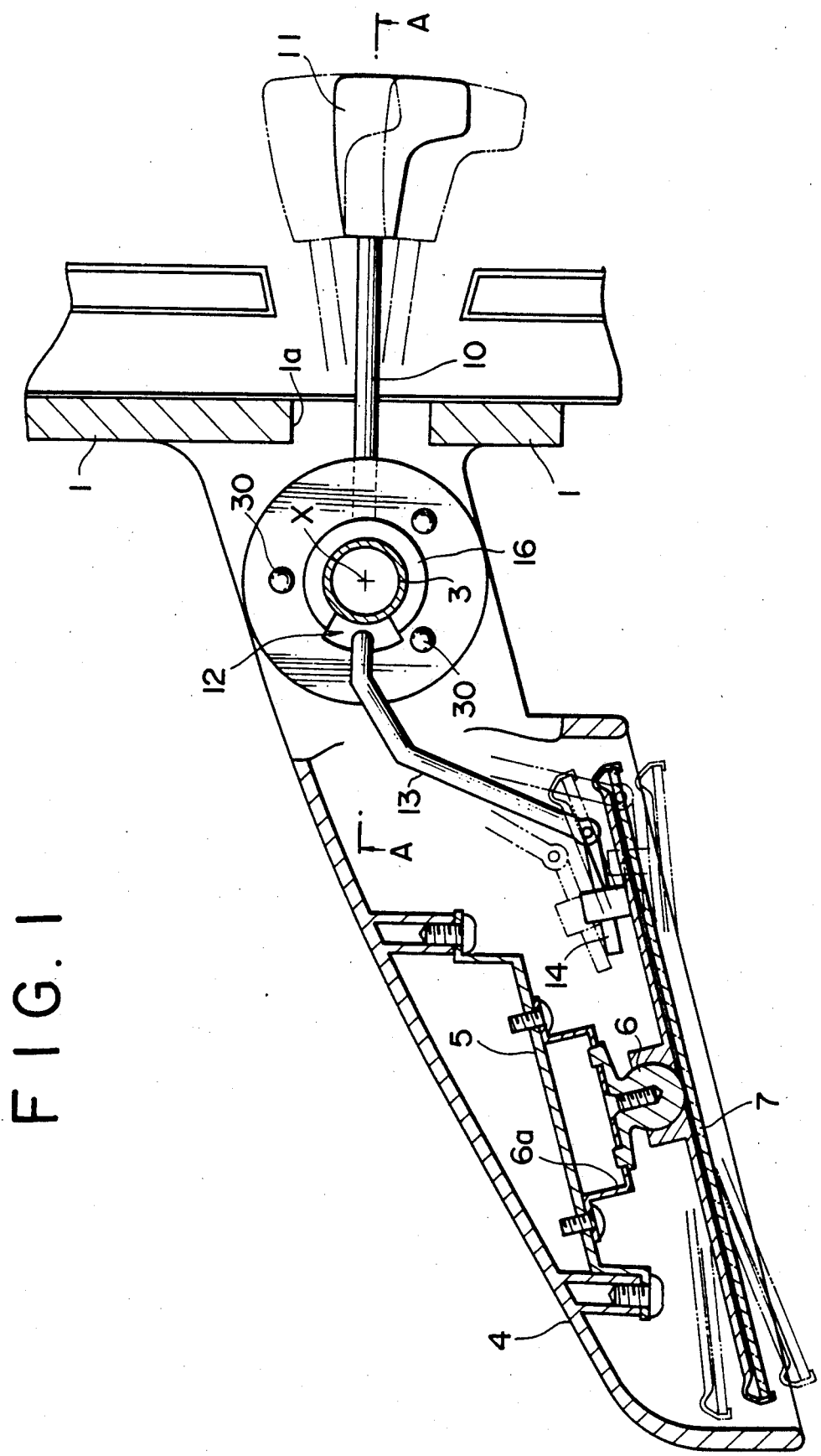
FIG. 1 is a schematic plan view, partly broken away, showing part of a remote controlled rearview mirror assembly according to the invention.

Now, an embodiment of the invention will be described with reference to the drawings. Referring to FIGS. 1 to 7, numeral 1 designates an attachment for mounting a mirror secured to a corner of a vehicle door window 3, numeral 2 designates a mirror base extending substantially horizontally from a lower portion of the attachment 1, numeral 3 designates a hollow shaft erected on the mirror base 2, and numeral 4 designates a mirror body mounted on the shaft 3 such as to be foldable in the longitudinal direction of the vehicle.

A mirror support 5 is provided in the mirror body 4, and a pivot base 6a with a pivot 6 at the central portion is mounted on the mirror support 5. A mirror (i.e., mirror panel) 9 is tiltably mounted vertically and laterally on the pivot 6 via the mirror holder 8 supporting it from its back side (see FIG. 1).

Reference numeral 10 designates a control lever for adjusting the angle of mirror unit 7 consisting of the mirror and mirror holder. One end of the control lever 10 is mounted on a ball joint to be described later. Reference numeral 11 designates a knob penetrating a horizontal guide hole 1a formed in the attachment 1 and mounted on an end of the lever 10 extending into the compartment, numeral 12 designates a ball joint provided at an intersection between the lever 10 and shaft 3, and numeral 13 designates a mirror operation arm having one end secured to the ball joint 12 such that it is symmetrical with respect to the control lever 10. A mirror operation bracket 14 is mounted on the free end of the mirror operation arm 13 and coupled to the back side of the mirror holder 8. The control lever 10 is freely rotatable about the center of the ball joint 12 in a predetermined angle range. The mirror operation arm 13 is rotatable with the level 10 so that the mirror operation bracket 14 effects adjustment of the angle of the mirror 9.

Figure 2:
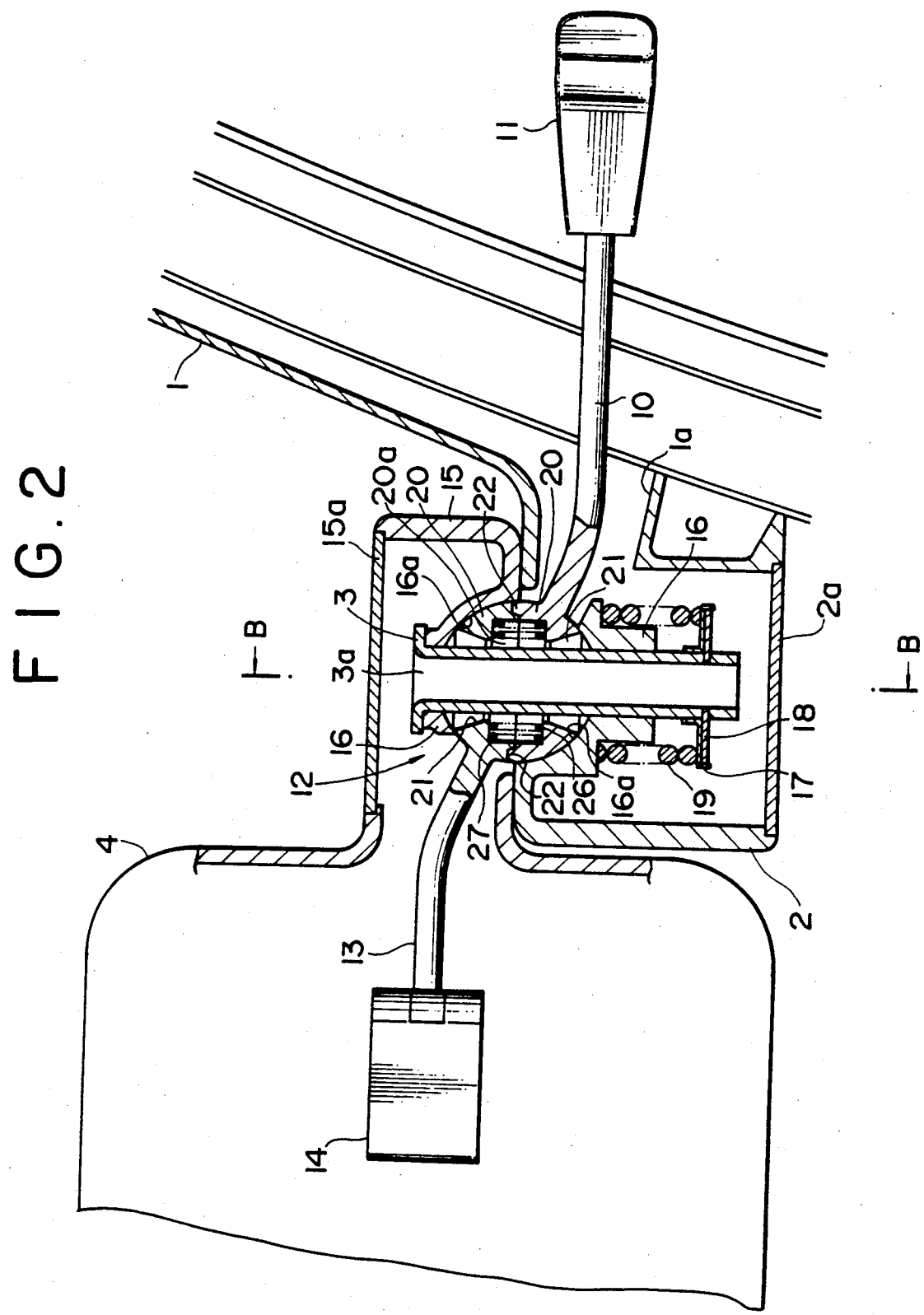
FIG. 2 is a schematic sectional view taken along line A—A in FIG. 1.
Figure 3:
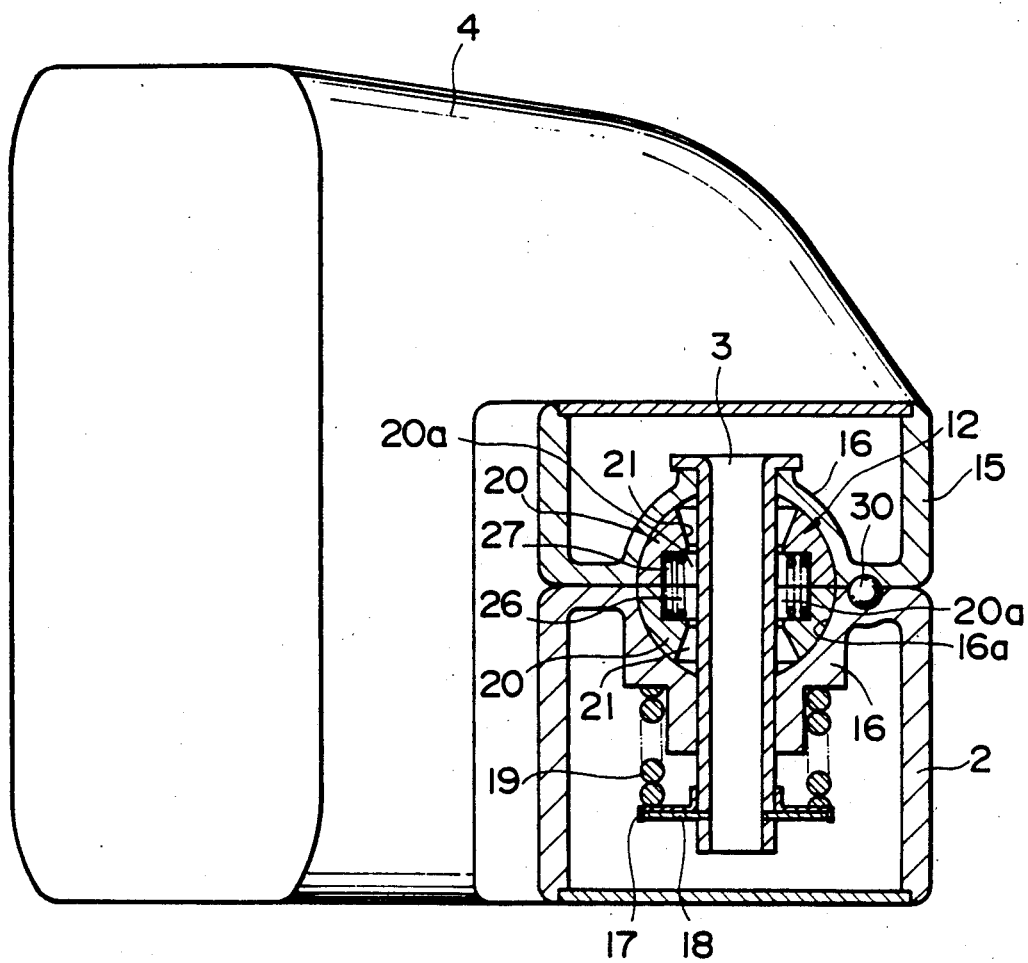
FIG. 3 is a schematic sectional view taken along line B—B in FIG. 2.

A frame 15, which is integral with or separate from the mirror body, is provided on one side of the mirror body 4. A pair ball seats 16 for supporting the ball joint 12 are provided on opposed surfaces of the frame 15 and base 2. The ball seats 16 have their opposed surfaces formed with respective semi-spherical cavity 16a, in which the ball joint 12 is fitted. As shown in FIGS. 2 and 3, the shaft 3 downwardly penetrates the assembly of the ball joint 12 and ball seats 16. The shaft 3 has a head 3a secured to the upper ball seat 16, and its lower portion is formed with notches 3b, in which a washer retainer 18 supporting a washer 17 is securely fitted. A compression spring 19 is provided in a compressed state between the washer 17 and the lower ball seat 16. The repulsion force of the spring 19 has an effect of compressibly contacting the pair ball seats 16 and semi-spherical members 20 to be described later against each other, thus compressibly contacting the ball joint 12 from above and below.

Figure 4:
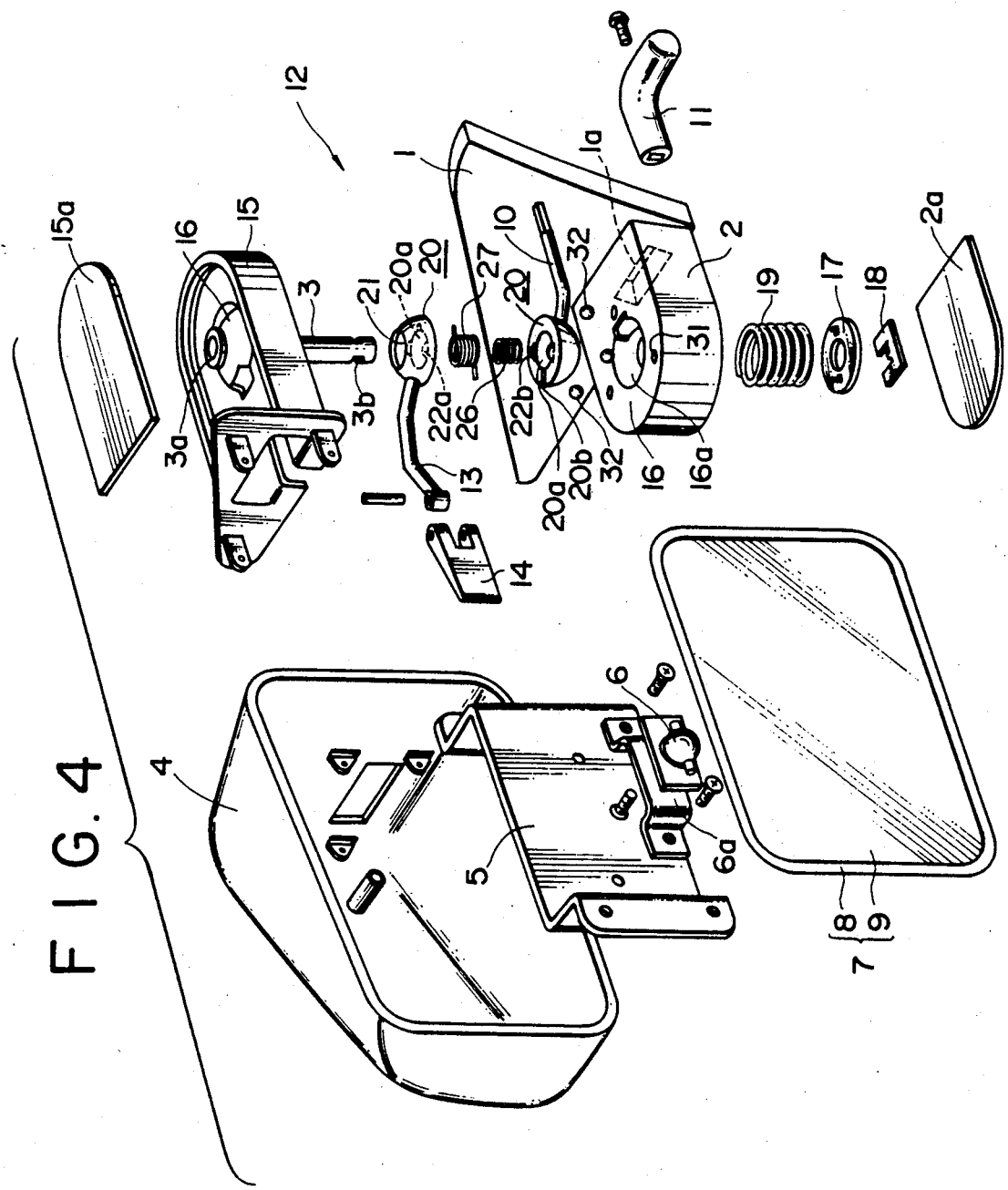
FIG. 4 is an exploded perspective view showing the rearview mirror assembly shown in FIG. 1.
Figure 5:
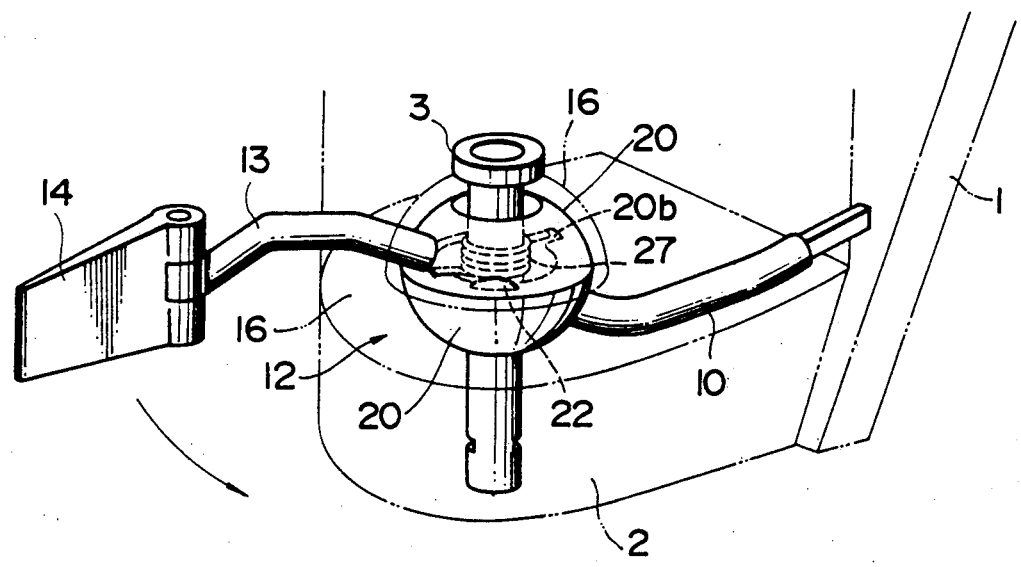
FIGS. 5 and 6 are perspective views showing the positional relationship of a ball joint mounted on a shaft, a first clutch, a control lever and a mirror operation arm when the mirror body is at a normal operating position and at a folded position, respectively.

The ball joint 12, as shown in FIG. 4, consists of a pair of, i.e., upper and lower, semi-spherical members 20 having respective through holes 21 which are penetrated by the shaft 3. The through holes 21 are formed such that they are perpendicular to each of the opposed surfaces of the semi-spherical members 20. They are elongate holes flaring like a trumpet vertically from the center of the ball joint, thus providing between their wall surfaces and the outer periphery of the shaft 3 penetrating them a clearance (not shown) to permit rotation of the ball joint.

The control lever 10 has one end secured to the outer surface of the one of the semi-spherical members 20 (i.e., the lower semi-spherical member in the illustrated case), and the mirror operation arm 13 is secured to the outer surface of the other semi-spherical member 20 (i.e., upper semi-spherical member) in correspondence to the control lever.

Figure 8:
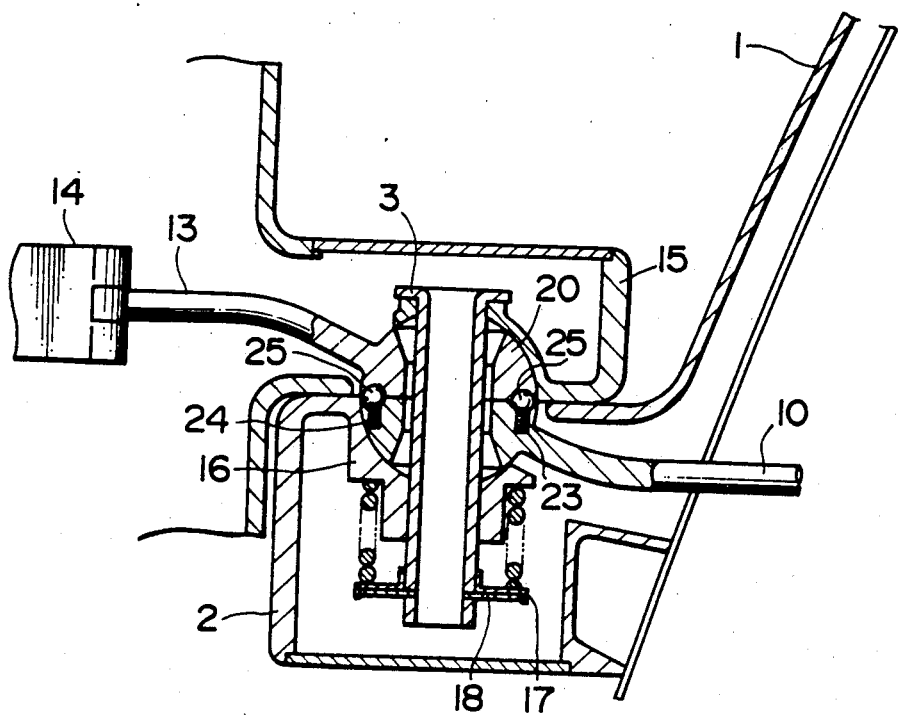
FIGS. 8 and 9 are respectively a fragmentary sectional view and an exploded perspective view showing a modification of the ball joint.
Figure 9:
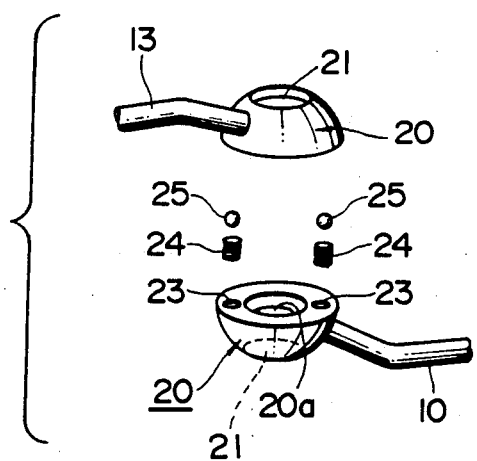

A first clutch 22 is provided on the opposed surfaces of the semi-spherical members 20. In a preferred embodiment, the clutch consists of a plurality of recesses 22a formed in one of the opposed surfaces and projections 22b formed on the other opposed surface such as to be engaged in the recesses. FIGS. 8 and 9 show a modification of the clutch. In this case, ball clutch are provided between the opposed surfaces of semi-spherical members 20. More specifically, the opposed surfaces of the semi-spherical members are provided with concave semi-spherical seats 23, and a ball 25 and a coil spring 24 are provided in each lower seat 23 such that the ball 25 is biased in the projecting direction by the coil spring 24 so that it is held engaged in the corresponding upper seat 23.

According to the invention, the opposed surfaces of the semi-spherical members 20 are formed with circular hollows 20a, in which a coil spring 26 is accommodated in a compressed state to bias the two semi-spherical members vertically and away from each other. A torsion spring 27 is disposed concentrically on the outer side of the compression spring 26. The spring 27 has its upper and lower ends secured in notches 20b formed with the surfaces of the respective upper and lower semi-spherical members. When the clutch between the two semi-spherical members 20 is disengaged so that these two semi-spherical members are rotated relative to each other, the torsion spring 27 is given a torsion torque, thus giving the two semi-spherical members a tendency of returning to their normal position.

A second clutch 30 is provided between the opposed surfaces of the pair ball seats 16 such that normally it holds the mirror body 4 in its erected state, i.e., normal position (neutral position), while avoiding a shock when a strong external force is applied to the mirror body 4 or when the mirror body is manually turned forwards or rearwards. More particularly, as shown in FIGS. 2 and 4, the opposed surfaces of the ball seats 16 surrounding the semi-spherical cavity 16a, are formed at like positions on and uniformly dividing a circle with concave semi-spherical seats 31, and balls 32 are received in the seats 31 of the lower ball seat. Each ball 32 is engaged in the corresponding upper semi-spherical seat 31 by a compression coil spring 33, which is provided under the ball 32 and biasing the ball 32 in the projecting direction. Thus, the mirror body 4 is held at the neutral position (see FIGS. 1 and 2). When a rearward or forward external force is applied to the mirror body 4, the engagement between each concave semi-spherical seat 31 and ball 32 is released by a click action against the repulsion force of the coil spring 19, so that the mirror body 4 is turned about the shaft 3 to be tilted by a certain angle to avoid a shock.

The operation of the remote controlled rearview mirror assembly will now be described.

As shown in FIGS. 2 to 4, the first clutch 22 is provided between the opposed surfaces of the semi-spherical members 20 constituting the ball joint 12. Normally, the recesses 22a and projections 22b of this clutch are in engagement with one another at fixed positions, and the two semi-spherical members 20 are held tightly coupled to each other by the restoring force of the spring 19. Thus, when the control lever 10 is rotated in this state in a vertical or lateral direction about the center X of the ball joint 12, the ball joint 12 undergoes sliding with the surfaces of the semi-spherical cavity 16a of the ball seats 16 and ball joint 12 as sliding surfaces. This vertical or lateral motion of the control lever 10 is transmitted via ball joint 12 to the mirror operation arm 13 to cause rotation of the mirror operation arm in the direction opposite to the direction of movement of the control lever 10 so as to push or pull the mirror unit 7. In this way, the mirror angle can be controlled under remote control in the compartment.

When the mirror body 4 is folded rearwards or forwards up to a limit angle immediately before it is touched the outer panel of the vehicle when transporting the vehicle or storing the vehicle in a garage or when it is tilted beyond the limit operation angle of the control lever 10, and mirror operation arm 13 due to an unexpected external shock, the first and second clutches 22 and 30 are disengaged to divide the ball joint 12 into upper and lower halves. No excessive load thus is applied to the control lever 10 and mirror operation arm 13. This will now be described in further detail. When the mirror operation arm 13 is forcibly rotated about the shaft 3 in the direction of arrow in FIGS. 5 to 7 when folding the mirror body 4 rearwardly, for instance, from the neutral position, a thrust force is generated in the direction of the axis of the shaft 3 of the semi-spherical members 20 by a tangential force acting on the projections of the clutch.

Figure 6:
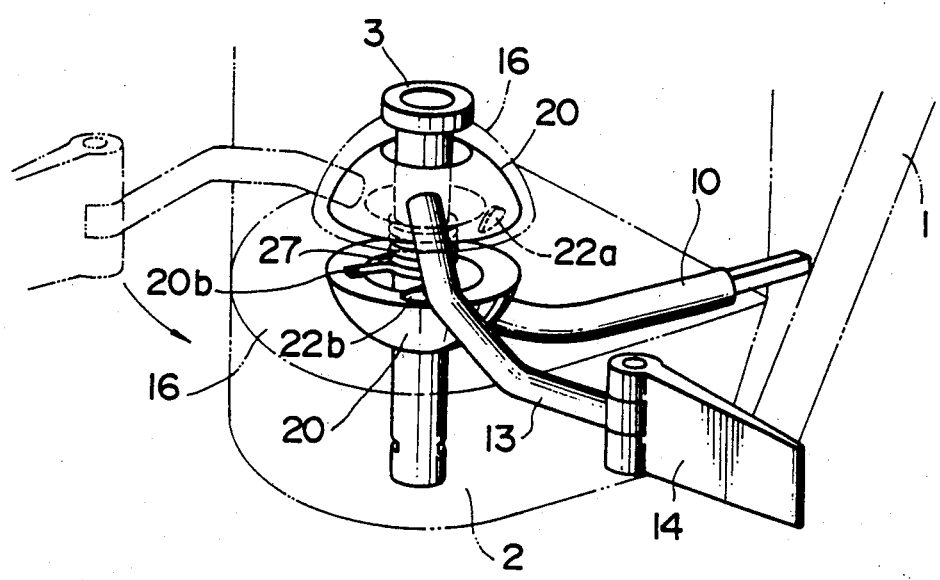
Figure 7:
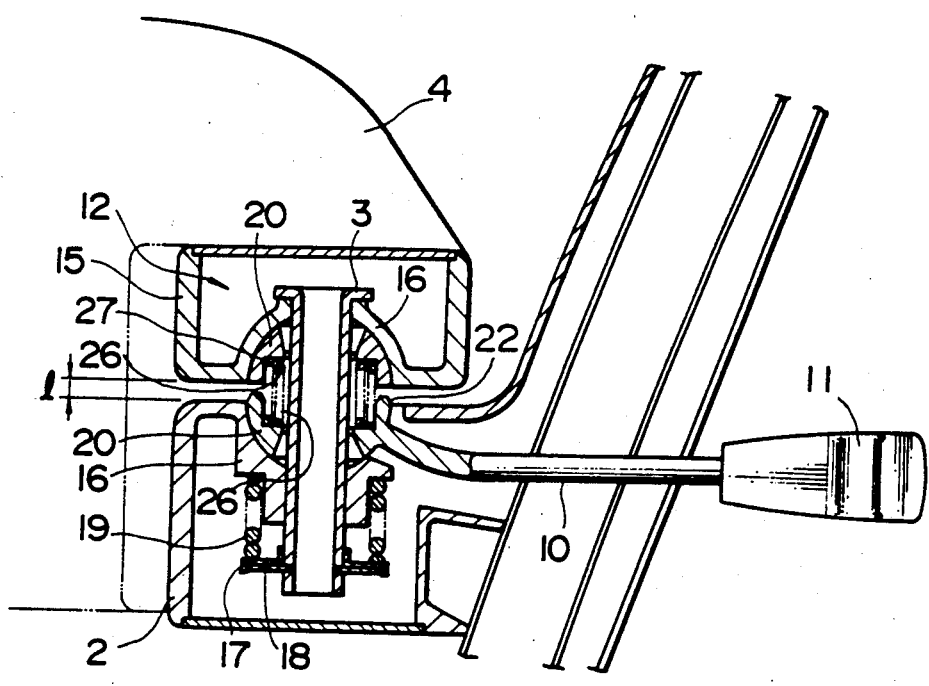
FIG. 7 is a fragmentary sectional view showing the positional relationship of the ball joint, a ball seat and the control lever when the mirror body is folded.

As a result, the ball joint 12 is divided into upper and lower halves as shown in FIG. 6. The first clutch 22 between the two semi-spherical members 20 is thus disengaged, and only the semi-spherical member 20 on the side of the mirror operation arm 13 is rotated in the direction of arrow. Meanwhile, the mirror body 4 is rotated about the shaft 3, and one of the ball seats is pushed down as shown in FIG. 7 by a thrust force generated in the axial direction of the hand shaft 3 by tangential forces acting on the balls 32 provided between the ball seats 16. Thus, the second clutch 30 is disengaged, so that the upper ball seat 16 rises on the balls. At this time, the two semi-spherical members 20 can be readily vertically separated by the restoring force of the spring 26 provided in a compressed state between the opposed surfaces of the two semi-spherical members 20. Thus, the mirror operation arm 13 can be operated beyond the limit operation angle of the control lever 10 as shown in FIGS. 6 and 7, so that the mirror body can be folded to be inside the outermost line of the vehicle without any overload applied to the control lever 10 and mirror operation arm 13.

Since the torsion spring 27 is provided between the two semi-spherical members 20, when the semi-spherical members 20 are rotated by a click action as shown in FIG. 6, a torque is applied to the torsion spring 27 to store a restoring force in the spring, but the mirror body is held in the folded state because of large frictional force between the balls 32 and each ball seat 16. However, when the mirror body 4 is forcibly returned to the neutral position slowly, the semi-spherical members 20 are rotated smoothly from the folded position shown in FIG. 6 to the normal (neutral) position shown in FIG. 5 by the restoring force of the torsion spring 27. Thus, the recesses 22a and projection 22b of the semi-spherical members 20 engage one another, so that the semi-spherical members are held at an adequate mounting angle.

Figure 10:
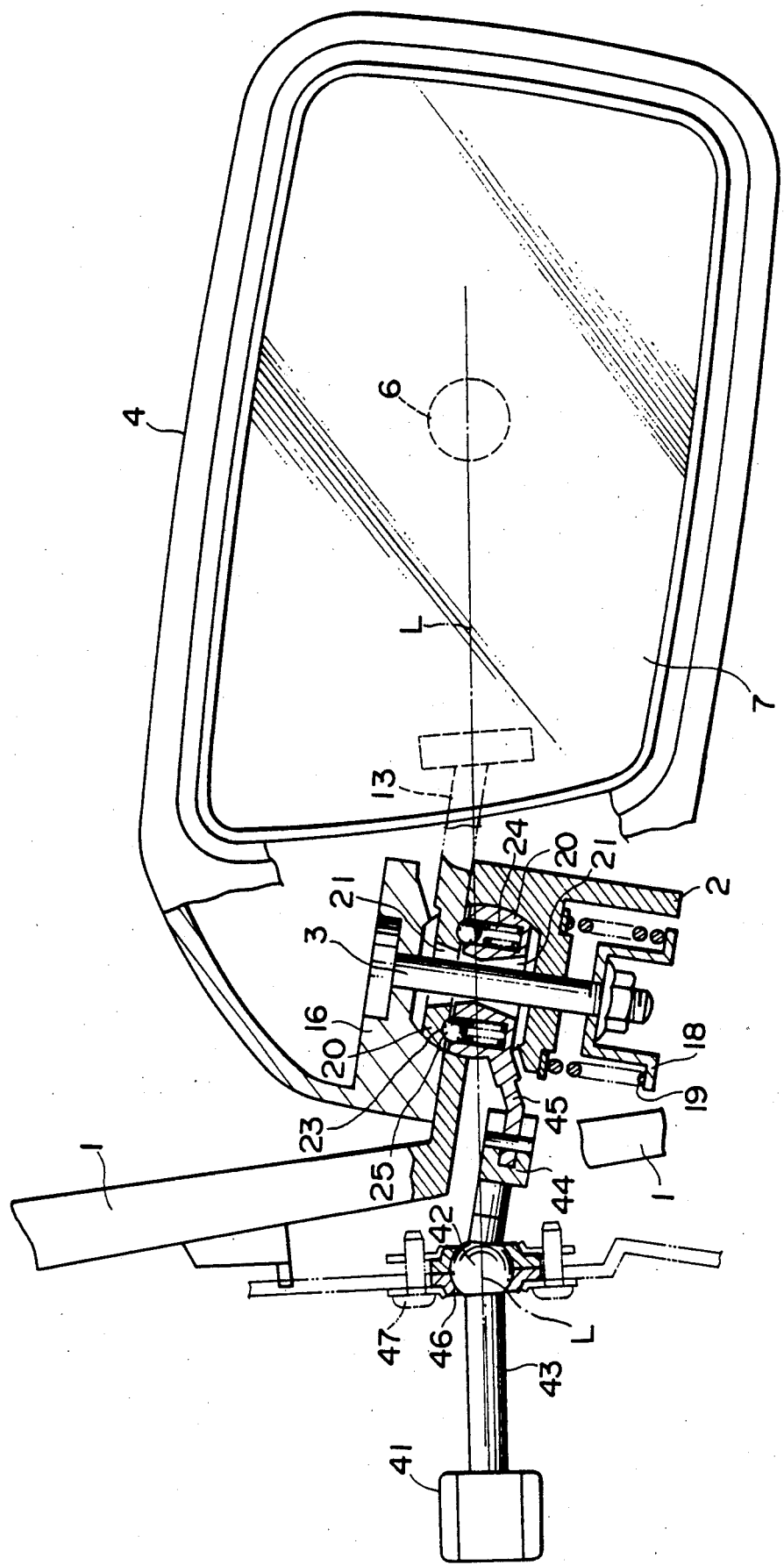
FIG. 10 is a fragmentary plan view, partly in section showing a modification of the remote controlled rearview mirror assembly according to the invention.
Figure 12:
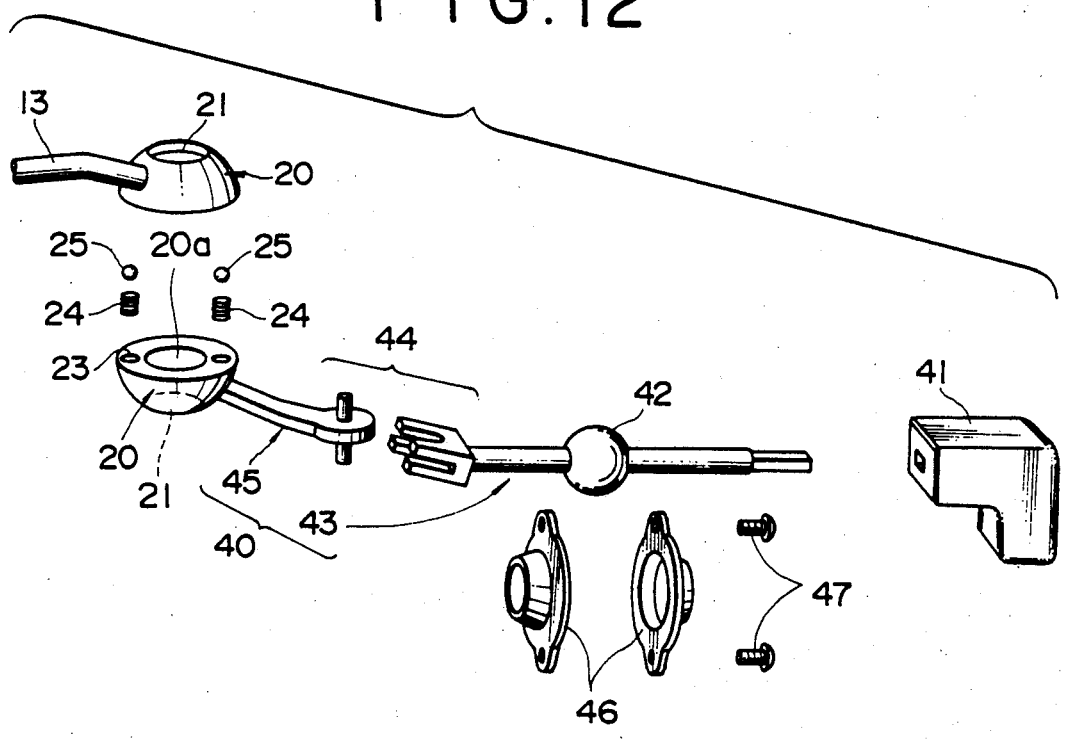
FIG. 12 is an exploded perspective view showing the control lever shown in FIG. 10.

FIGS. 10 and 11 show a modification of the above embodiment of the rearview mirror assembly according to the invention. The mechanism of this modification includes a control lever 40 consisting of first and second levers 43 and 45 coupled together by a universal coupling mechanism as shown in the exploded perspective view of FIG. 12. The first lever 43 has a knob 41 provided at one end and a spherical pivot 42 provided at an axially intermediate portion. The second lever 45 has one end secured to ball joint 12 consisting of a pair of vertically separable semi-spherical members 20 and the other end pivoted by a universal coupling 44 to the first lever 43. Between the opposed surfaces of the two semi-spherical members is provided a ball clutch 22 including balls 25 and springs 24 accommodated in concave semi-spherical seats 23. Although not shown, opposed central surface portions of the two semi-spherical members may be provided with hollows, and compression springs 26 and torsion springs 27 may be provided in the hollows in the same manner as shown in FIG. 4. The spherical pivot 42, as shown in FIG. 11, is secured by holder plates 46 and set screws 47 to a stem portion of the mounting base 2. The mechanism is secured such that the center of the ball joint 12 lies in a line L connecting the center of the pivot 42 of the first lever 43 and the center of the pivot 6 of the mirror unit, as shown in FIGS. 10 and 11.

Thus, in this embodiment the force for turning the first lever 43 vertically or laterally about the spherical pivot 42 is transmitted via the universal coupling 44 and ball joint 12 to the second lever 44. Consequently, the first lever 31 and mirror operation arm 13 are moved forwardly (in the same direction) to push or pull the mirror unit 7. Thus, mirror angle adjustment can be very readily done.

What is claimed is:

1. A remote control mechanism comprising:
   a base;
   a shaft erected on said base and having an outer periphery;
   a ball joint pivotably mounted on said outer periphery of said shaft and consisting of a pair of vertically separable semi-spherical members, and a first clutch provided between opposed surfaces of said semi-spherical members;
   a compression coil spring provided on said outer periphery of said shaft and between and perpendicular to the opposed surfaces of said semi-spherical members;
   a pair of ball seats each with a respective semi-spherical cavity for holding said ball joint from above and below, and a second clutch provided between opposed surfaces of said ball seats;
   compression spring means provided in a lower portion of said ball seats for providing forces of engagement to said first and second clutches;
   a control lever having one end secured to an outer surface of one of said pair of semi-spherical members;
   an operation arm having one end secured to an outer surface of the other one of said pair of semi-spherical members symmetrically with respect to said control lever; and
   bracket means mounted on a free end of said operation arm and coupled to an operable member.

2. A remote control mechanism as claimed in claim 1, wherein said second clutch includes a ball provided on one of the opposed surfaces of said ball seats, a concave spherical seat in which said ball provided on another of the opposed surfaces of said ball seats is received, said compression spring means providing forces to said ball toward a direction of engaging with said concave spherical seat and, when an outer force is applied, engagement of said ball and said concave spherical seat being released toward an axial direction of said shaft.

3. A remote control mechanism as claimed in claim 1, and further comprising a torsion spring provided on the outer periphery of said shaft and between opposed surfaces of said pair semi-spherical members and having opposite ends each secured to each of said semi-spherical members.

4. A remote control mechanism according to claim 1, wherein said control lever includes a first lever pivotably mounted on said base and a second lever having one end secured to the outer surface of one of said semi-spherical members, said first and second levers being coupled together by a universal coupling.

5. A remote control mechanism according to claim 4, wherein said first lever includes a knob mounted at one end and a spherical pivot formed in an axially intermediate portion, said base includes a pair of holder plates for holding said spherical pivot.

6. A remote control mechanism as claimed in claim 1, wherein said pair semi-spherical members have through holes extending perpendicularly to their opposed surfaces, said through holes being elongate holes flaring vertically like a trumpet from the center of said ball joint so that a clearance is provided between the inner surfaces of said elongate holes and the outer periphery of the shaft penetrating said elongate holes to permit rotation of said ball joint.

7. A remote controlled rearview mirror assembly comprising:
   a base for mounting a mirror on a vehicle;
   a shaft erected on said base;
   a mirror body rotatably mounted on said shaft;
   a mirror unit tiltably mounted on a pivot in said mirror body;
   a ball joint pivotably mounted on an outer periphery of said shaft and consisting of a pair of vertically separable semi-spherical members and a first clutch provided between opposed surfaces of said semi-spherical members;
   a compression coil spring provided on said outer periphery of said shaft and between and perpendicular to the opposed surfaces of said semi-spherical members;
   a pair of ball seats each with a respective semi-spherical cavity for holding said ball joint from above and below, and a second clutch provided between opposed surfaces of said ball seats;
   compression spring means provided on the outer periphery of said shaft and in a lower portion of said ball seats for providing forces of engagement to said first and second clutches;
   a control lever having one end secured to an outer surface of one of said pair of semi-spherical members;
   an operation arm having one end secured to an outer surface of the other one of said pair of semi-spherical members symmetrically with respect to said control lever; and
   bracket means mounted on a free end of said operation arm and coupled to said mirror unit.

8. A remote controlled rearview mirror assembly according to claim 7, wherein said control lever includes a first lever pivotably mounted on said base and having a knob provided on an end portion extending into a compartment and a second lever having one end secured to the outer surface of one of said pair semi-spherical members, said first and second levers being coupled to each other via a universal coupling, the center of said ball joint lying substantially on a straight line connecting the center of the pivot of said lever and the center of the pivot of said mirror unit.

* * * * *